United States Patent
Vancoille et al.

(10) Patent No.: US 7,239,790 B2
(45) Date of Patent: Jul. 3, 2007

(54) METHOD FOR CONTROLLING ATTENUATION OF AN OPTICAL ELEMENT

(75) Inventors: Eric Vancoille, Singapore (SG); Frank J. Flens, Turin (IT)

(73) Assignee: Avago Technologies Fiber IP (Singapore) Pte. Ltd., Singapore (SG)

(*) Notice: Subject to any disclaimer, the term of this patent is extended or adjusted under 35 U.S.C. 154(b) by 155 days.

(21) Appl. No.: 11/166,623

(22) Filed: Jun. 23, 2005

(65) Prior Publication Data
US 2006/0291081 A1    Dec. 28, 2006

(51) Int. Cl.
G02B 6/00   (2006.01)
G02B 6/12   (2006.01)

(52) U.S. Cl. .................... 385/140; 385/14; 359/885
(58) Field of Classification Search ............ 385/14, 385/27, 140; 359/885
See application file for complete search history.

(56) References Cited

U.S. PATENT DOCUMENTS

| | | | |
|---|---|---|---|
| 5,150,242 A * | 9/1992 | Fellows | 359/108 |
| 6,335,998 B2 * | 1/2002 | Wagoner et al. | 385/140 |
| 6,483,981 B1 * | 11/2002 | Krahn et al. | 385/140 |
| 6,493,478 B1 * | 12/2002 | DeRosa et al. | 385/16 |
| 2006/0062518 A1 * | 3/2006 | Galstian et al. | 385/27 |

* cited by examiner

*Primary Examiner*—Sung Pak
*Assistant Examiner*—Daniel Petkovsek

(57) ABSTRACT

A method for controlling the attenuation of an optical element. A base material, such as a resin, is selected from which to fabricate the optical element. The base material has an intrinsic attenuation or intrinsic absorption spectrum. A predetermined concentration of a first type of dye molecule is then added to the base material to vary the intrinsic attenuation of the base material to achieve a predetermined absorption spectrum.

20 Claims, 4 Drawing Sheets

METHOD FOR CONTROLLING ATTENUATION OF AN OPTICAL ELEMENT

BACKGROUND OF THE INVENTION

Communicating information through light instead of electrical signals has many useful applications. The medium for light travel is typically a fiber optic cable. A transceiver circuit is typically coupled to each end of the fiber optic cable and includes an optical transmitter that performs transmission functions and an optical receiver that performs receiving functions. The transmitter includes a laser that acts as a source of light. An important component in the transceiver is an optical element that receives the light generated by the laser and launches the light into the fiber optic cable in a manner that minimizes reflections back to the laser and that provides favorable launch conditions to increase the bandwidth of the system. There are some situations in which it is desired to decrease the optical power of the laser signal.

There are several current prior art approaches to decrease the optical power of the laser signal. One approach to decrease the optical power of the laser signal is to apply partially reflective coatings on a surface of the optical element. Although these coatings provide tolerable control over the direction in which unwanted light is reflected, these coatings tend to be expensive. Furthermore, these coatings are prone to de-adhesion from the optical element, which can lead to undesirable results in the field.

Another approach to decrease the optical power of the laser signal is to machine or otherwise cause one surface of the optical element to become a textured surface. For example, surfaces of the optical element can be roughened surfaces. These textured surfaces act to scatter incoming light by re-distributing the light in a wide range of directions. It is noted that these textured surfaces do not absorb the incoming light. Unfortunately, the scattered light may cause interference or other problems with components adjacent to the optical element.

Yet another approach to utilize diffractive optical elements and partial beam blockers in the optical signal path between the laser and the fiber optic cable. Unfortunately, the diffractive optical elements and partial beam blockers tend to influence the optical signal's modal behavior. Consequently, these elements tend to complicate the design and placement of the laser, especially in terms of determining the appropriate launch intensity.

Based on the foregoing, there remains a need for a method and apparatus that controls the attenuation of an optical element that overcomes the disadvantages set forth previously.

SUMMARY OF THE INVENTION

According to one embodiment of the present invention, a method for controlling the attenuation of an optical element is described. A base material, such as a resin, is selected from which to fabricate the optical element. The base material has an intrinsic attenuation or intrinsic absorption spectrum. A predetermined concentration of a first type of dye molecule is then added to the base material to vary the intrinsic attenuation of the base material to achieve a predetermined absorption spectrum.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method for controlling attenuation of an optical element is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100

Figure 1:
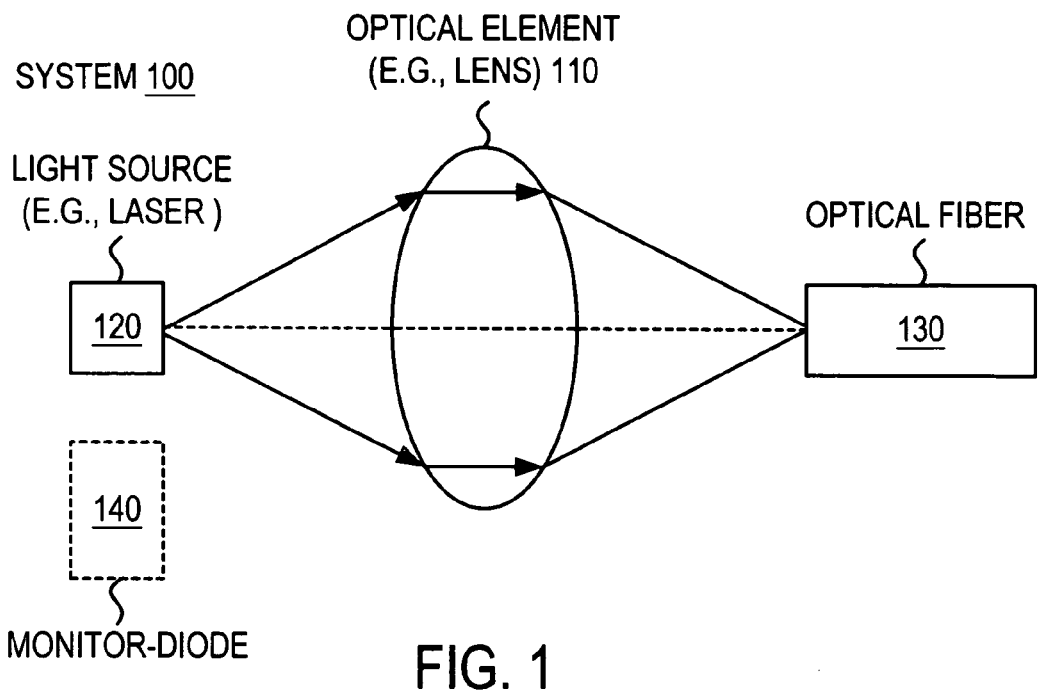
FIG. 1 illustrates a system in which the optical element of the invention can be implemented.

FIG. 1 illustrates a system 100 in which the optical element 110 of the invention can be implemented. The system 110 includes a light source 120 (e.g., a laser), an optical element 110, and optic fiber 130. Light, depicted as rays, is outputted by the laser 120 and provided to the optical element 110. The optical element 110 directs the light to the optic fiber 130 for transmission therein. The optical element 110 according to one embodiment of the invention is described in greater detail hereinafter with reference to FIGS. 2 and 3.

In one embodiment of the invention, the system 100 is a transmission module of a fiber optic transceiver. For example, the attenuator optical element 110 of the invention is utilized in a transmission path (e.g., as part of the transmitter module) in the fiber optics transceiver.

Attenuator 110

Figure 2:
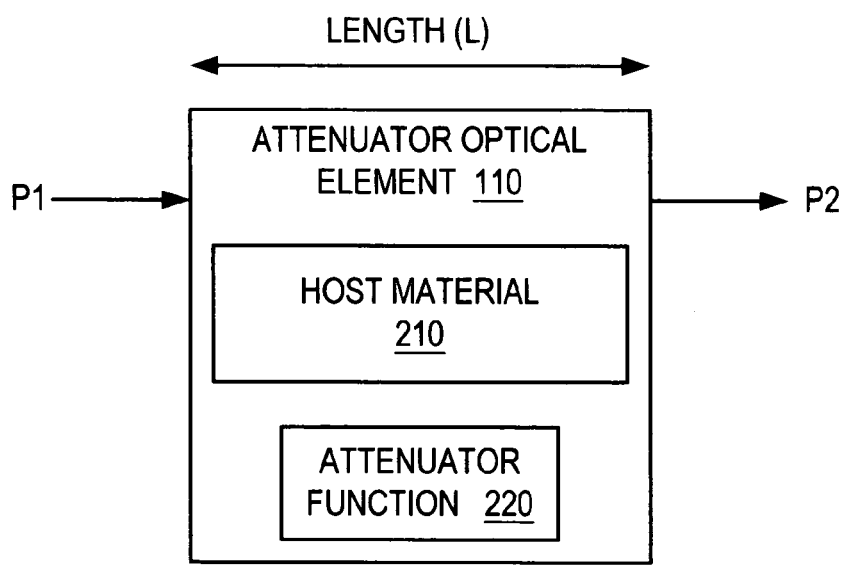
FIG. 2 illustrates an exemplary attenuator optical element according to one embodiment of the invention.

FIG. 2 illustrates an exemplary attenuator optical element 110 according to one embodiment of the invention. In one embodiment, the optical element 110 is implemented with a monolithic block of polymeric material 210 with a predetermined length (L). The monolithic block of polymeric material includes an attenuator function 220 that ensures that the average light optical power at the outgoing or exit side (e.g., right side) is less than the average light optical power at the incoming side (e.g., left side).

In other words, an attenuator optical element receives an incoming optical signal with a first average optical power P1 and generates or provides an outgoing optical signal with a second average optical power P2. It is noted that the light path can extend along the entire length L of the optical element or can extend along a portion of the length of the optical element (e.g., partially through the length of the optical element).

According to one embodiment of the invention, an attenuator optical element is described. The attenuator optical element includes a base material, such as a resin. In one embodiment, the base material is polyetherimide that is about 98 wt % of the material. The base material has an intrinsic attenuation or intrinsic absorption spectrum. The attenuator optical element also includes a predetermined concentration of a first type of dye molecule that is added to the base material to vary the intrinsic attenuation of the base material to achieve a predetermined absorption spectrum. In one embodiment, the dye, which can include one or more different types of dye molecules, is less than about 2 wt % of the material.

Attenuator Physics

Figure 3:
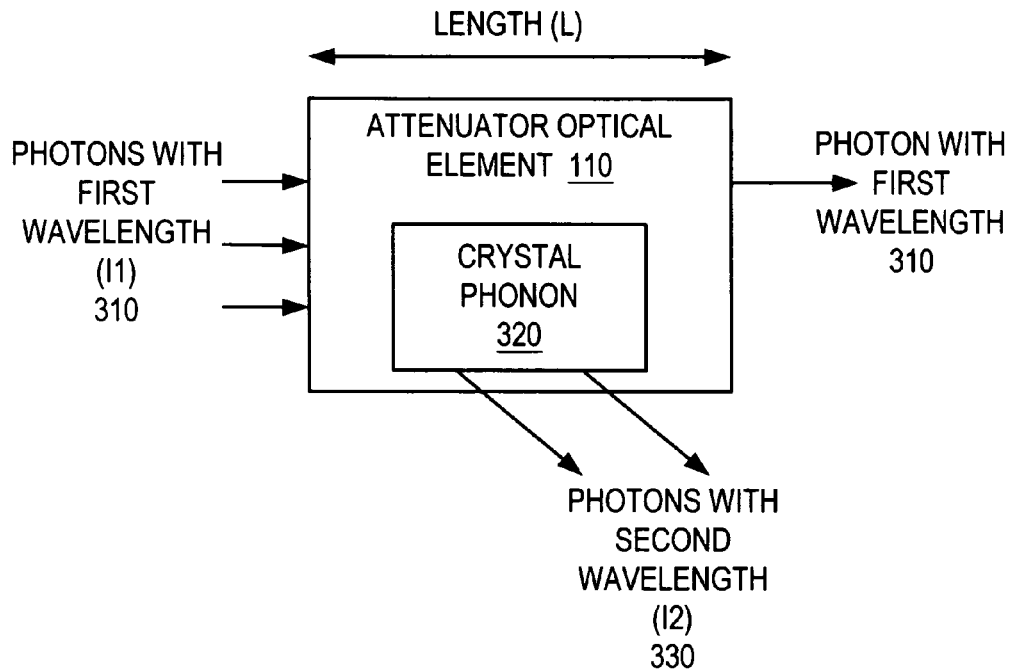
FIG. 3 illustrates the physics of an absorber-attenuator according to one embodiment of the invention.

FIG. 3 illustrates the physics principle of an absorber-attenuator according to one embodiment of the invention. In one embodiment, the material of the attenuator optical element converts incoming radiation with an energy (hn1) into molecular lattice vibrations by utilizing one or more types of dye molecules. For example, the incoming photon (I1) is converted to a crystal phonon (i.e., a lattice vibration), which emits photons of a much larger wavelength (I2). In one embodiment, the dye molecules are homogenously distributed through the optical block of material. The use of dye molecules is described in greater detail hereinafter with reference to FIG. 4.

The molecular vibrations are eventually expressed to the outside of the optical element as a type of radiation (e.g., heat) with an energy much lower than the incident energy entering the optical element.

Figure 5:
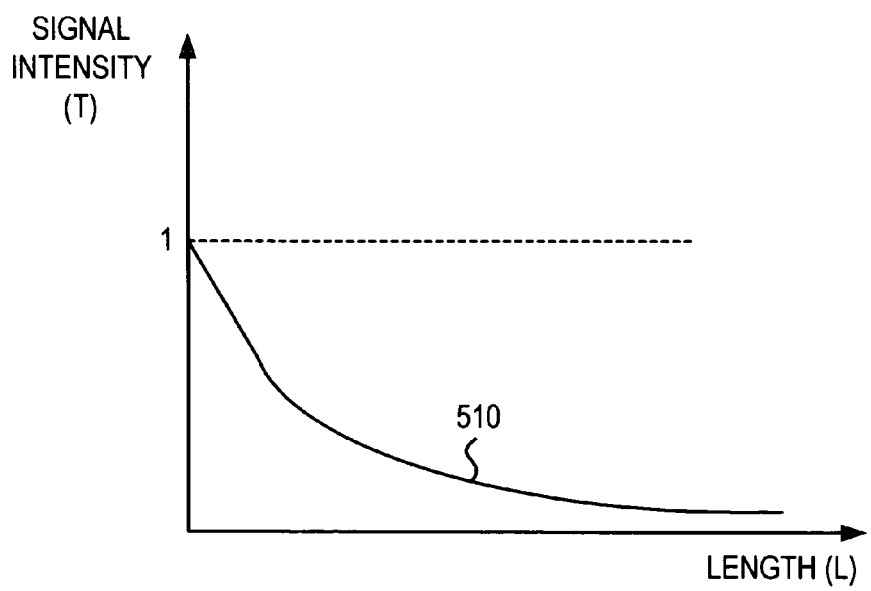
FIG. 5 illustrates an exemplary signal intensity versus length graph of an optical element according to one embodiment of the invention.

FIG. 5 illustrates an exemplary signal intensity versus length graph of an optical element according to one embodiment of the invention. The vertical axis represents signal intensity (T), and the horizontal axis represents the length of the optical element. As the length of the optical element (e.g., absorbing optical block) increases, the observed attenuated light intensity experiences an exponential drop or decrease. Consequently, this effect on signal intensity can be expressed in a decibel scale (e.g., a logarithmic scale) as a linear quantity that may be expressed as decibel per millimeter block length, for example. This quantity is also referred to herein as "intrinsic" attenuation of the block of polymer material. It is noted that the waveform that represents the optical signal decays over length as an exponential of the intrinsic attenuation multiplied by the length.

Figure 6:
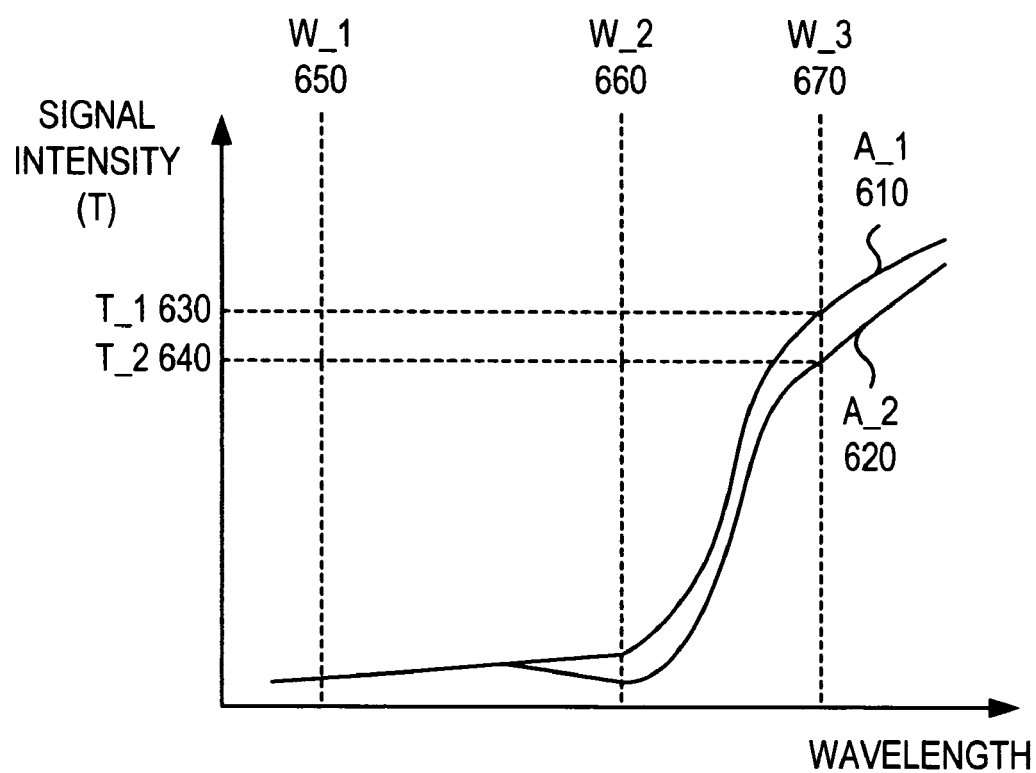
FIG. 6 illustrates an exemplary signal intensity versus wavelength graph of an optical element according to one embodiment of the invention.

FIG. 6 illustrates an exemplary signal intensity versus wavelength graph of an optical element according to one embodiment of the invention. The vertical axis represents signal intensity (T) for a block optical element with constant length (L), and the horizontal axis represents the wavelength of incident radiation (P1). The vertical axis is also referred to as the transmitted optical power curve (P2) and represents the signal transmitted by the optical element. By selecting different dye molecules and by creating different resulting compositions according to the invention, the attenuation characteristics (e.g., absorbance versus wavelength spectrum) optical element may be tailored to meet the requirements of a specific application. For example, the composition of the optical element may be tailored for substantial suppression of the visible spectrum (e.g., in the range or about 400 nm to about 700 nm) and a predetermined level of transmission at a predetermined wavelength range (e.g., the range about the 850 nm region).

In this example, a first attenuation curve (A1) 610 and a second attenuation curve (A2) 620 are shown. Both curves 610 and 620 exhibit substantial attenuation in the range from about a first wavelength (W1) 650 to a second wavelength (W2) 660. At about a third wavelength (W3) 670, the first curve 610 has a first intensity value (T1) 630 and the second curve 620 has a second intensity value (T2) 640.

One or more different types of dye molecules can be added together to achieve substantial or complete light blockage at a predetermined range of wavelengths (e.g., visible wavelengths from W1 to W2) in a certain portion of the optical element. Also, one or more different types of dye molecules can be added together to achieve a controllable light intensity attenuation for one or more wavelengths (e.g., a second predetermined range of wavelengths) in a portion of the optical element. The correlation between the amount of dye molecules and the attenuation attained or achieved may be established and verified experimentally.

When the optical element is utilized in fiber optical transceiver applications that employ a broadband detection element (e.g., monitor-diode 140), substantially blocking the light at visible wavelengths is advantageous since scattered light from visible wavelengths may produce a false "received signal" at the detector.

It is noted that absorbing dyes can have an absorption peak or peaks with certain values, and at the same time the peaks each have a predetermined width. Both the height of the absorption peak and width of the peak are to be considered in selection of the dye-type and dye-concentration. The height and width of the peaks determine the absorption characteristics and range of the dye.

Processing to Control the Attenuation of an Optical Element

Figure 4:
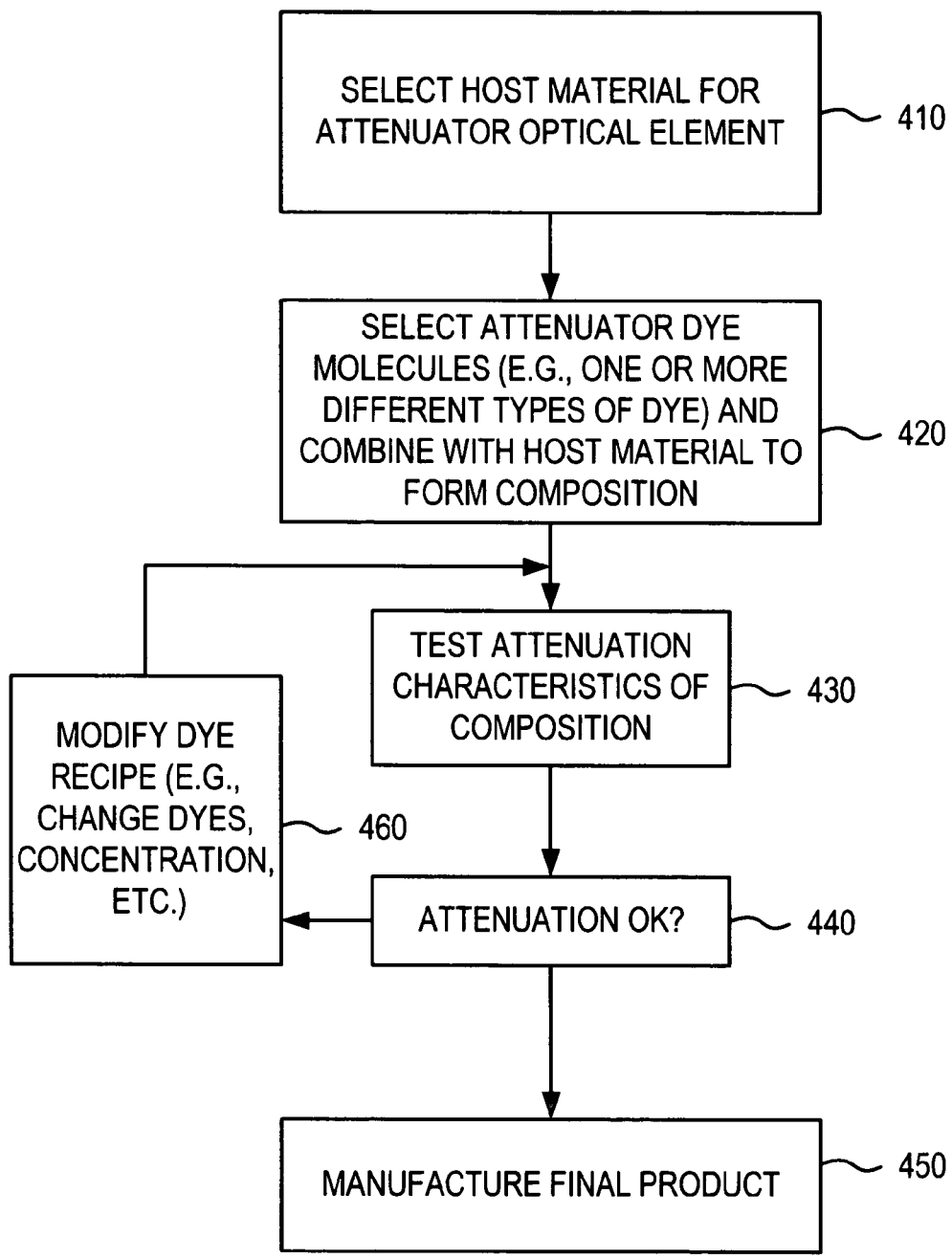
FIG. 4 is a flowchart illustrating the processing steps to manufacture the optical element according to one embodiment of the invention.

FIG. 4 is a flowchart illustrating a method for controlling the attenuation of an optical element according to one embodiment of the invention. In step 410, a host material, such as a base resin, is selected. The host material can include, but is not limited to, polyetherimides, polyimides, poly(phenyl)sulphones, plastics, and other polymeric materials. Preferably, for the fiber-optic transceiver application, the host material is a polymeric material that has a glass transition temperature in excess of temperatures common in the manufacture or processing of fiber-optic transceivers. These temperatures can exceed 200 degrees Celsius due to the manufacturing processes, such as board soldering. In one embodiment, the polymeric material is selected from thermoplasts that have a high molecular weight, that are aromatic, that are aliphatic, and that contain complex molecules.

Moreover, because fiber optic transceivers have an operating range of about −20 degrees Celsius to about 85 degrees Celsius at any humidity, in fiber optic transceiver applications, it is preferred that the polymeric material selected does not absorb water molecules above a predetermined limit or amount. Water molecules in the optical element increase the risk of crack formation in the optical element, which in turn may lead to failure of the lens.

In step 420, one or more different types of attenuator dyes are selected and then combined with the host material for form a composition. For example, the attenuator dye may be mixed, blended, or otherwise combined with the host material to form a composition for the optical element. In one embodiment, a single type of attenuator dye (e.g., molecules of a single type of dye) is combined with the host material to form a resulting composition. In another embodiment, a several different types of attenuator dye (e.g., molecules of four types of different dye) are combined with the host material to form a resulting composition.

The attenuator dye can include, but are not limited to, anthraquinone single dye, palladium dithiolene single dye, platinum dithiolene single dye, nickel dithiolene dye, phtalocyanine dye, azo dye, aromatic amines dye, methine dye, cyanine dye, and other types of dyes. Preferably, the dyes are resistant to high temperatures, such as the temperatures common to processing of optic transceivers and operation thereof as discussed previously.

In step 430, the attenuation characteristics of the composition is tested. This step can include the following substeps. For example, a test plate can be created (e.g., molded) from the composition. The test plate is then tested by determining the absorption spectrum of the test plate with light measurements and comparing the measured absorption spectrum with the predetermined design requirement (e.g., a predetermined specific absorption spectrum). When it is determined that the attenuation meets one or more predetermined requirements, a test lens is created. For example, a test lens may be molded and then subject to tests and corresponding measurements.

In step 440 a determination is made whether the attenuation of the composition fails to meets one or more predetermined requirements. When the attenuation characteristics of the composition do not meet the predetermined specific absorption spectrum, the dye recipe is modified and a new test plate is created, tested, etc. in step 460. For example, the dye recipe may be modified by adjusting the concentration of the dye molecules, by introducing new dye molecules into the composition or by deleting or omitting exiting dye molecules from the composition.

When it is determined that the attenuation meets the predetermined requirements, a final attenuator lens product is created in step 450. Otherwise, as noted previously with reference to step 440, when it is determined that the attenuation fails to meets one or more predetermined requirements, the dye recipe is modified in step 460, and the testing of step 430 is performed again. For example, the concentration of the dye may be modified or a different dye molecule may be selected. It is noted that one or more different dye molecules may be utilized to realize the absorbance versus wavelength characteristics or spectrum.

In one embodiment, the apparatus and method for controlling attenuation of an optical element according to one embodiment the invention can be implemented in a fiber optic transceiver. However, it is noted that the apparatus and method for controlling attenuation of an optical element according to one embodiment may be beneficial in any system in which there is a need to attenuate light power or there is a need to create a specific absorption spectrum.

One advantage of this approach is that the apparatus and method for controlling attenuation of an optical element according to one embodiment of the invention is manufacturable and may be mass-produced in a cost effective manner. Stated differently, by integrating the attenuation function into the optical element, the apparatus and method for controlling attenuation of an optical element avoids mechanical manipulation of a separate element that would require high manufacturing costs to align, etc.

Another advantage of this approach is that the apparatus and method for controlling attenuation of an optical element according to one embodiment of the invention enables a designer to customize and to meet different design requirements by varying factors, such as the concentration of the dye, combination of different dyes, and selection of different dyes, etc. These design requirements may vary due to different applications, different design requirements, different wavelength ranges, and different degrees of attenuation.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method of controlling attenuation in an optical element comprising: fabricating a monolithic block of polymeric material with a predetermined length, wherein the monolithic block of polymeric material comprises an integrated attenuator block material that reduces the optical power received by the optical element; adding a first concentration of a first dye to fully absorb light having a first wavelength to the attenuator block material; and adding a first concentration of a second dye to partially absorb light having a second wavelength.

2. The method of claim 1, and further comprising adjusting the length of the monolithic block of polymeric material.

3. The method of claim 1, and further comprising adjusting the concentration of the first dye.

4. The method of claim 1 wherein adding a first concentration of first dye includes adding a first concentration of cyanine dye.

5. The method of claim 1, and further comprising adjusting the first concentration of the first dye to vary the intrinsic attenuation of the attenuator block material.

6. The method of claim 1 wherein adding a first concentration of second dye comprises adding a first concentration of nickel dithiolene dye.

7. The method of claim 1, and further comprising adjusting the first concentration of the second dye to vary the intrinsic attenuation of the attenuator block material.

8. The method of claim 1, wherein the first dye absorbs visible light; and the second dye partially absorbs light at a first predetermined wavelength and a second predetermined wavelength; wherein one of the first and second wavelengths is a wavelength of light generated by a laser source.

9. The method of claim 1 wherein the first dye absorbs light that has a wavelength in the range of about 400 nm to about 700 nm; a first concentration of a second type of attenuator block material to partially absorb light at a first predetermined wavelength and a second predetermined wavelength includes adding a first concentration of a second type of attenuator block material to partially absorb light at about 850 nm and at about 1300 nm.

10. The method of claim 1 wherein fabricating a monolithic block of polymeric material includes fabricating a monolithic block of polyetherimide.

11. The method of claim 1 wherein the first dye has a predetermined absorption spectrum.

12. The method of claim 1 wherein at least one dye includes at least one of cyanine dye that absorbs light in a first range of wavelengths, cyanine dye that absorbs light in a second range of wavelengths, nickel dithiolene dye that absorbs at a first maximum wavelength, and nickel dithiolene dye that absorbs at a second maximum wavelength.

13. The method of claim 1, wherein the second dye partially absorbs light between about 850 nm and about 1300 nm.

14. An optical element comprising:
- a monolithic block of polymeric material with a predetermined length, wherein the monolithic block of polymeric material comprises an integrated attenuator block material that reduces the optical power received by the optical element;
- a first concentration of a first dye that fully absorbs light having a first wavelength, the first dye being in the attenuator block material; and
- a first concentration of a second dye that at least partially absorbs light having a second wavelength, the second dye being in the attenuator block material.

15. The optical element of claim 14 wherein the first dye comprises cyanine dye.

16. The optical element of claim 14, wherein the first concentration of the first dye corresponds to the intrinsic attenuation of the attenuator block material.

17. The optical element of claim 14, wherein the second dye comprises nickel dithiolene.

18. The optical element of claim 14, wherein the first dye at least partially absorbs light that has a wavelength in the range of about 400 nm to about 700 nm.

19. The optical element of claim 14, wherein the monolithic block of polymeric material comprises polyetherimide.

20. The optical element of claim 14, wherein at least one dye includes at least one of cyanine dye that absorbs light in a first range of wavelengths, cyanine dye that absorbs light in a second range of wavelengths, nickel dithiolene dye that absorbs at a first maximum wavelength, and nickel dithiolene dye that absorbs at a second maximum wavelength.

* * * * *

UNITED STATES PATENT AND TRADEMARK OFFICE
CERTIFICATE OF CORRECTION

| | | |
|---|---|---|
| PATENT NO. | : 7,239,790 B2 | Page 1 of 1 |
| APPLICATION NO. | : 11/166623 | |
| DATED | : July 3, 2007 | |
| INVENTOR(S) | : Eric Vancoille | |

It is certified that error appears in the above-identified patent and that said Letters Patent is hereby corrected as shown below:

Col. 6 Line 47(Approx.) In Claim 9, after "nm;" insert -- and wherein adding --.

Col. 6 Line 60 In Claim 12, after 70 nm; insert -- and wherein adding a first concentration of a second type of attenuator block material to partially absorb light at a first predetermined wavelength and a second predetermined wavelength includes adding a first concentration of a second type of attenuator block material to partially absorb light at about 850 nm and at about 1300 nm --.

Signed and Sealed this

Seventeenth Day of February, 2009

JOHN DOLL
*Acting Director of the United States Patent and Trademark Office*